US008330574B2

(12) United States Patent
DiSalvo

(10) Patent No.: US 8,330,574 B2
(45) Date of Patent: Dec. 11, 2012

(54) REMOTE VEHICLE ACTIVATION DEVICE

(75) Inventor: Jason DiSalvo, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 1107 days.

(21) Appl. No.: 12/200,408

(22) Filed: Aug. 28, 2008

(65) Prior Publication Data

US 2010/0052850 A1 Mar. 4, 2010

(51) Int. Cl.

| | |
|---|---|
| ***G06F 7/00*** | (2006.01) |
| ***G06F 7/04*** | (2006.01) |
| ***G08B 29/00*** | (2006.01) |
| ***G08C 19/00*** | (2006.01) |
| ***H04B 1/00*** | (2006.01) |
| ***H04B 3/00*** | (2006.01) |
| ***H04Q 1/00*** | (2006.01) |
| ***H04Q 9/00*** | (2006.01) |

(52) U.S. Cl. ........ 340/5.72; 340/5.7; 340/5.71; 340/5.2; 340/5.8; 340/693.5; 340/693.7; 340/693.12; 340/572.8

(58) Field of Classification Search .................. 340/5.72
See application file for complete search history.

(56) References Cited

U.S. PATENT DOCUMENTS

| | | | | |
|---|---|---|---|---|
| 4,754,255 | A | 6/1988 | Sanders et al. | |
| 5,305,980 | A | 4/1994 | Le Blanc | |
| 5,388,691 | A | 2/1995 | White | |
| 5,819,568 | A | 10/1998 | Christie et al. | |
| 5,864,297 | A | 1/1999 | Sollestre et al. | |
| 6,016,676 | A | 1/2000 | McConnell | |
| D441,185 | S | 5/2001 | Shimizu et al. | |
| D441,524 | S | 5/2001 | Shimizu et al. | |
| 6,243,022 | B1 | 6/2001 | Furukawa | |
| 6,545,629 | B1 | 4/2003 | Johnson et al. | |
| 6,669,017 | B2 | 12/2003 | Linihan | |
| 6,713,895 | B1 | 3/2004 | Krapfl | |
| D514,527 | S | 2/2006 | DiPasquale | |
| 7,006,015 | B2 | 2/2006 | England | |
| 7,034,238 | B2 | 4/2006 | Uleski et al. | |
| 7,166,812 | B2 | 1/2007 | White et al. | |
| 7,248,201 | B2 | 7/2007 | Buccinna et al. | |
| 7,315,143 | B2 * | 1/2008 | Mullet et al. | 318/280 |
| 7,441,651 | B1 * | 10/2008 | Sullivan | 206/38.1 |
| 2002/0008610 | A1 | 1/2002 | Peterson | |
| 2004/0203512 | A1 * | 10/2004 | Ho et al. | 455/90.3 |
| 2006/0023442 | A1 | 2/2006 | De Los Santos et al. | |
| 2006/0145810 | A1 | 7/2006 | Buccinna et al. | |
| 2006/0227031 | A1 | 10/2006 | Benbow | |
| 2007/0033974 | A1 | 2/2007 | Calavenna | |
| 2007/0044997 | A1 | 3/2007 | Schumacher et al. | |
| 2007/0227866 | A1 | 10/2007 | Dimig | |
| 2009/0091477 | A1 * | 4/2009 | Mc Call et al. | 340/990 |

* cited by examiner

*Primary Examiner* — George Bugg
*Assistant Examiner* — Anthony D Afrifa-Kyei
(74) *Attorney, Agent, or Firm* — Mark Duell, Esq.; Emerson Thomson Bennett

(57) ABSTRACT

A vehicle activation device may serve as a transmitter and may have at least two function buttons that remotely activate two corresponding functions in an associated vehicle. A cover may be pivoted to a body and may be movable between at least two positions to make the function buttons accessible or inaccessible.

12 Claims, 3 Drawing Sheets

REMOTE VEHICLE ACTIVATION DEVICE

BACKGROUND OF THE INVENTION

A. Field of Invention

This invention pertains to the art of methods and apparatuses relating to gaining access to a vehicle via a remote control device and more specifically, to methods and apparatuses relating to a vehicle's accessibility system such as key and remote key or keyless entry functions.

B. Description of the Related Art

It is well known in the art to provide keys for use in gaining access to a vehicle (such as to unlock the passenger doors) and for use in starting the vehicle's engine. More recently, it is known to provide wireless remotely operated keys for the same purposes. It is also known in the art to provide vehicle keys that include security devices or integrated circuits that enable the vehicle to recognize the key. Only then will the vehicle activate the engine for the operator. This "intelligent" key is designed to minimize the chance of theft.

It is also well known in the art to provide an electronic "keyless" entry system that will remotely grant vehicle access to the operator as long as the operator is within a certain radius to the vehicle. The remote keyless system typically emits a radio or infrared signal that the vehicle recognizes and thus permits access to the vehicle's interior.

It is also known in the art to implement additional control functions into the key or keyless remote systems. Modern vehicle key remotes have functionality to control the opening and closing of side doors and trunk doors and can also remotely start the vehicle. Key remotes may also have an alarm or "panic" button that when pressed, activates the vehicle's security system. As a result, the vehicle may emit visual and/or audio cues.

It is also known in the art for a vehicle to have an electronic key remote and not require a mechanical key to gain access to a vehicle. Modern vehicles have been programmed with the ability to automatically unlock the vehicle as the operator approaches the vehicle (as long as the remote is on their person). Additionally, while the key is located inside the vehicle, the operator has the ability to push a "start" button instead of inserting and turning the ignition key.

However, with the adoption of remote key/keyless technology, the possibility of accidentally or inadvertently pressing a key function button has become more common. An operator could, for one example, accidentally open the side door of a vehicle via the key/keyless entry system without knowledge. What is needed is an apparatus to minimize the accidental keyless entry system button activations.

SUMMARY OF THE INVENTION

According to one embodiment of this invention, a vehicle activation device may comprise: a body having a first end and a first side; a cover having a first end and a first side, wherein the first end of the cover is pivotally connected to the first end of the body; a first function button that is accessible from the first side of the body and that remotely activates a first function in the associated vehicle; and a second function button that is accessible from the first side of the cover and that remotely activates a second function in the associated vehicle. The cover may be pivotal into: (1) a first position where the cover provides access to the first function button; and, (2) a second position where the cover prevents access to the first function button and provides access to the second function button.

According to another embodiment of this invention, a vehicle activation device may comprise: a body having a first side; a cover that is pivotally connected to the body about a pivot axis that is substantially perpendicular to the first side of the body; a first function button that is accessible from the first side of the body and that remotely activates a first function in the associated vehicle; and, a second function button that is accessible from the first side of the body and that remotely activates a second function in the associated vehicle. The cover may be pivotal into: (1) a first position where the cover provides access to the first and second function buttons; and, (2) a second position where the cover prevents access to the first function button and provides access to the second function button.

One advantage of this invention is that the chance for accidental activation of a function button is greatly minimized.

Another advantage of this invention is the ability to put more features or display additional information on the vehicle activation device.

Yet another advantage of this invention is that the vehicle activation device cover makes certain buttons inaccessible when desired.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

DETAILED DESCRIPTION OF THE INVENTION

Figure 3:
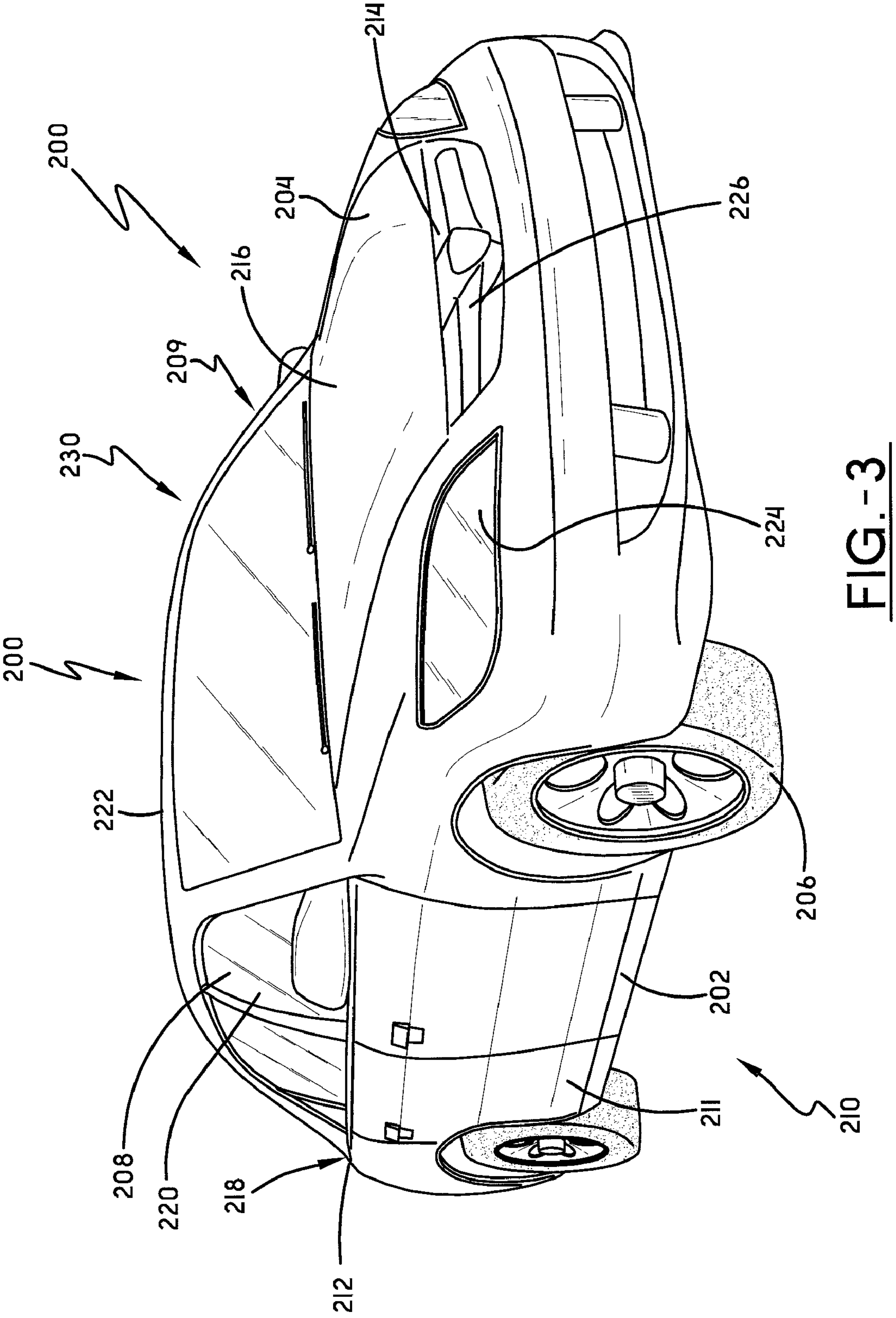
FIG. 3 is a perspective view of an automobile.

Referring now to the drawings wherein the showings are for purposes of illustrating embodiments of the invention only and not for purposes of limiting the same, and wherein like reference numerals are understood to refer to like components, FIG. 3 shows a vehicle 200 which may use a vehicle activation device according to this invention. While the vehicle 200 shown is an automobile, it is to be understood that the vehicle activation device of this invention will work with any vehicle including, for some non-limiting examples, any mode of transportation including vans, SUVs, trucks, off-road vehicles, motorcycles, aircraft and sea-faring vessels. The vehicle 200 may include a frame 202, one or more ground engaging wheels 206 supported to the frame 202, and a locomotion source 204, supported to the frame 202, and for use in providing locomotion for the vehicle. The locomotion source could be of any type chosen with the sound judgment of a person of skill in the art including, for some non-limiting examples, an internal combustion engine (ICE), an electric motor, and so called "hybrids" which combine an ICE with an electric motor.

The vehicle activation devices 10, 110, shown in FIGS. 1A-1C and 2A-2C and discussed further below, may be used to activate any one or more of the vehicle functions of vehicle 200, shown in FIG. 3. The particular vehicle functions activated by the vehicle activation devices 10, 110, can be any chosen with the sound judgment of a person of skill in the art. Some non-limiting examples of functions that may be activated include: providing access to the vehicle passenger compartment 208 such as by unlocking one or more of the exterior doors 210 (either a left side passenger door 209, or a right side passenger door 211); opening and/or closing one or more of the exterior doors 210; providing access to the vehicle locomotion compartment 214 such as by locking and/or unlocking the hood 216; opening and/or closing the hood 216; providing access to the vehicle storage compartment 218 such as by locking and/or unlocking the trunk lid or hatch back door 212; opening and/or closing the trunk lid or hatch back door 212; opening and/or closing one or more of the vehicle windows 220; operating a vehicle top 222 (in the case that the vehicle has a foldable, stowable top) to open and/or close; activating the locomotion source 204 of the vehicle 200 to start and/or to shut down; activating one or more light sources 224 to turn on, turn off, and/or to flash; activating one or more sound sources 226, such as a vehicle horn or siren, to turn on, turn off, and/or to cycle on/off; activating a vehicle security system 230 to turn on and/or turn off; and, activating any type of power assist technology such as power sliding doors or power tailgates. The term "vehicle activation device" as used in this patent is hereby defined as any device that permits the user to activate or assist in activating any one or more of the vehicle's functions. A vehicle activation device therefore comprises both key and keyless systems.

With continuing reference to FIGS. 1A-1C, 2A-2C and 3, both vehicle activation devices 10, 110 may serve as remote transmitters that are programmed to cooperate with a specific vehicle to permit the operator or controller of the transmitter to activate one or more vehicle functions, as explained above. By providing remote access it is meant that the transmitter can be used to emit a signal from a distance to a specific vehicle that is equipped to process the signal. By "a distance" it is meant the transmitter/operator does not have to be positioned within the vehicle passenger compartment 208. By "process the signal" it is meant that the specific vehicle is able to receive, interpret, verify and use the signal generated by the activation device. Any method and/or system chosen with the sound judgment of a person of skill in the art can be provided on the vehicle 200 to process the signals. As such methods and systems are well known in the art, no further explanation will be provided here. Each of the vehicle activation devices 10, 110 may include at least one function button 18. The term "function button" may be defined as any apparatus that, when triggered or prompted by the operator, remotely causes at least one vehicle function to activate. Some non-limiting examples of function buttons that may be used with this invention include: push buttons; motion sensors; touch-sensitive pads; and, voice activation devices.

With reference now to FIGS. 1A-1C and 3, the vehicle activation device 10 according to one embodiment of this invention may include a body 12 having a first side 14 and a second side 16. For the embodiment shown, the first side 14 of the body 12 may have multiple function buttons 18 for use in activating corresponding multiple vehicle functions. For the specific, but non-limiting example shown, the function buttons 18 include: a function button 20 for use in locking one or more of the exterior doors 210 of the vehicle 200; a function button 22 for use in unlock the same exterior doors 210; and, a "panic" function button 24 for use in activating audible and/or visual alarms 226 on the vehicle 200. In this way, the panic function button 24 acts as a security measure for the operator in case an unsafe or potentially unsafe situation is encountered. For the embodiment shown the function buttons 18 may also include: a function button 26 for use in opening and/or closing rear hatch back door 212; a function button 28*a* for use in opening and/or closing the left side passenger door 209, and a function button 28*b* for use in opening and/or closing the right side passenger door 211.

Figure 1C:
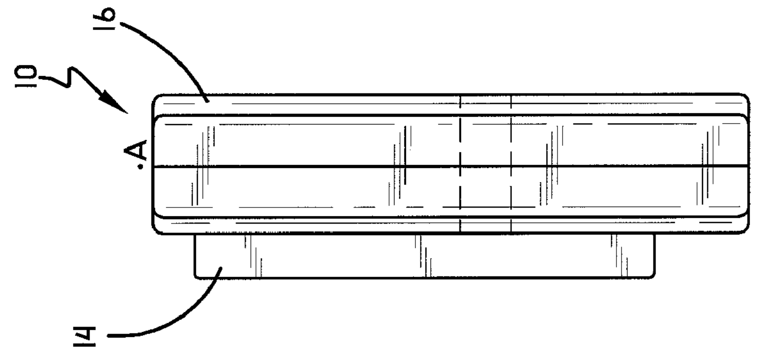
FIG. 1C is a side view of the vehicle activation device of FIG. 1A shown along line A-A.
Figure 1B:
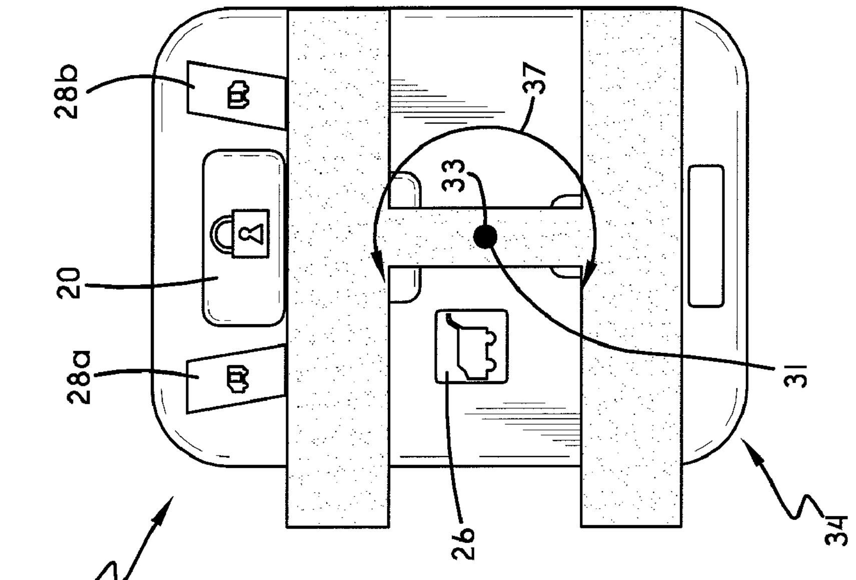
FIG. 1B is a top view of the vehicle activation device of FIG. 1A but showing the cover in a second position.

Still referring to FIGS. 1A-1C and 3, a multimode portable electronic fob in the form of the vehicle activation device 10 may also have a cover 30. The cover 30 may be used to achieve at least one of a number of purposes. In one embodiment, the cover 30 may be used to protect the body 12, or at least portions of the body 12, from wear, weather, and the like. In another embodiment, the cover 30 may be used to provide and/or prevent access to one or more function buttons 18. For the embodiment shown, the cover 30 may be pivotally connected to the body 12 about a pivot axis 31 that is substantially perpendicular and centered equidistant from the opposing edges of the first side 14 of the body 12. The pivotal motion of the cover 30 with respect to the body 12 is shown in FIG. 1B with direction arrow 37. The pivotal connection between the cover 30 and the body 12 may be of any type chosen with the sound judgment of a person of skill in the art. In one non-limiting example, the cover 30 may be pivotal about a pivot pin or axle 33 that is operatively connected to the body 12 and the cover 30. The relative pivotal motion of the cover 30 with respect to the body 12 may be achieved in any manner chosen with the sound judgment of a person of skill in the art. In one embodiment, the cover 30 is manually pivotal by the operator. In a more specific embodiment, the cover 30 may be manually pivotal but include a biasing mechanism 39 such as a torsion spring to return the cover 30 to a specific position once the manual force is removed.

Figure 1A:
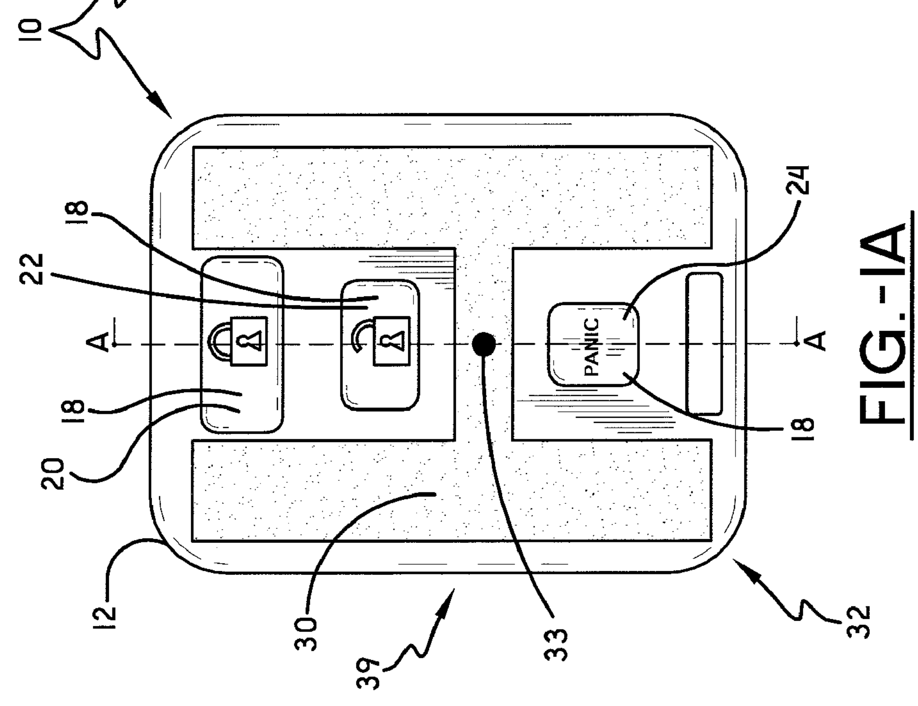
FIG. 1A is a top view of a vehicle activation device according to one embodiment of this invention showing the cover in a first position.

With continuing reference to FIGS. 1A-1C and 3, the specific function buttons 18 that are rendered accessible and inaccessible based on the relative position of the cover 30, can be any chosen with the sound judgment of a person of skill in the art. In FIG. 1A the cover 30 is shown in a first position 32 where function buttons 20, 22 and 24 are accessible (and therefore visible) while function buttons 28*a*, 28*b* and 26 are inaccessible (and therefore not visible). In FIG. 1B the cover 30 is shown pivoted (approximately 90 degrees about the pivot axis 31) into a second position 34 where function buttons 20, 28*a*, 28*b* and 26 are accessible (and therefore visible) while function buttons 22 and 24 are inaccessible (and therefore not visible). In one specific embodiment, it may be desirable to provide one or more function buttons 18 to remain accessible regardless of the position of the cover 30. Function button 20, for example, is accessible (and therefore visible) both in the first position (FIG. 1A) and in the second position (FIG. 1*b*). FIGS. 1A and 1B also show that the cover 30 can fully overlap the body 12 when in the first position 32 and can project beyond the body 12 in the second position 34.

With reference now to FIGS. 1A-1C, both the body 12 and cover 30 may have any size and shape chosen with the sound judgment of a person of skill in the art. For the embodiment shown, the body 12 has a substantially rectangular shape. The shape of the cover 30 may be coordinated with the positioning of the function buttons 18 so that the desired function buttons

18 are accessible or inaccessible based on the position of the cover 10. For the specific embodiment shown, the cover 30 is substantially H-shaped.

Figure 2C:
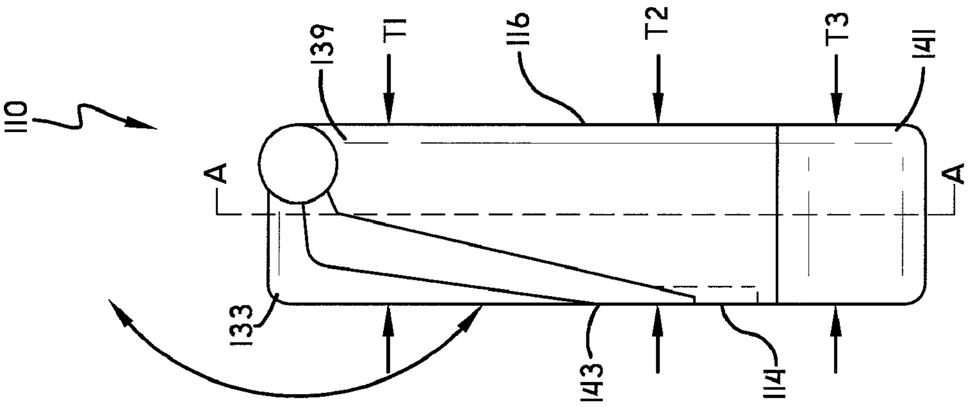
FIG. 2C is a side view of the vehicle activation device of FIG. 2A shown along line A-A.

With reference now to FIGS. 2A-2C and 3, another embodiment vehicle activation device 110 is shown. The vehicle activation device 110 includes a cover 130 that is pivotally connected to a body 112 and used to provide and/or prevent access to one or more function buttons 118. For the embodiment shown, one end 133 of the cover 130 may be pivotally connected to one end 139 of the body 112 about a pivot axis 131. This pivotal connection between the cover 130 and the body 112 may be of any type chosen with the sound judgment of a person of skill in the art. In one non-limiting example, the cover 130 may be pivotal about a pivot pin or axle 135 that is operatively connected to the body 112 and the cover 130. The relative pivotal motion of the cover 130 with respect to the body 112 may be achieved in any manner chosen with the sound judgment of a person of skill in the art. In one embodiment, the cover 130 is manually pivotal by the operator. The pivotal motion of the cover 130 with respect to the body 112 is shown in FIG. 2C with direction arrow 137.

With continuing reference to FIGS. 2A-2C and 3, the body may have first and second sides 114, 116 and the cover 130 may also have first and second sides 136, 140. For the embodiment shown, the first side 114 of the body 112 and the first side 136 of the cover 130 may have multiple function buttons 118 for use in activating corresponding multiple vehicle functions. In alternate embodiments, one or more function buttons 118 may also be provided on the second side 140 of the cover 130. For the specific, but non-limiting example shown, the function buttons 118 provided on the first side 136 of the cover 130 include: a function button 120 for use in locking one or more of the exterior doors 210 of the vehicle 200; a function button 122 for use in unlocking the same exterior doors 210; and, a "panic" function button 124 for use in activating audible and/or visual alarms 226 on the vehicle 200. The second side 140 of the cover 130 has an informational display 142 which may display any desired information such as, for some non-limiting examples, any status of the locomotion source 204 or its components, outdoor temperature, and passenger compartment temperature. The function buttons 118 provided on the first side 114 of the body 112 may include: a function button 126 for use in opening and/or closing rear hatch back door 212; a function button 128 for use in starting the locomotion source 204.

Figure 2B:
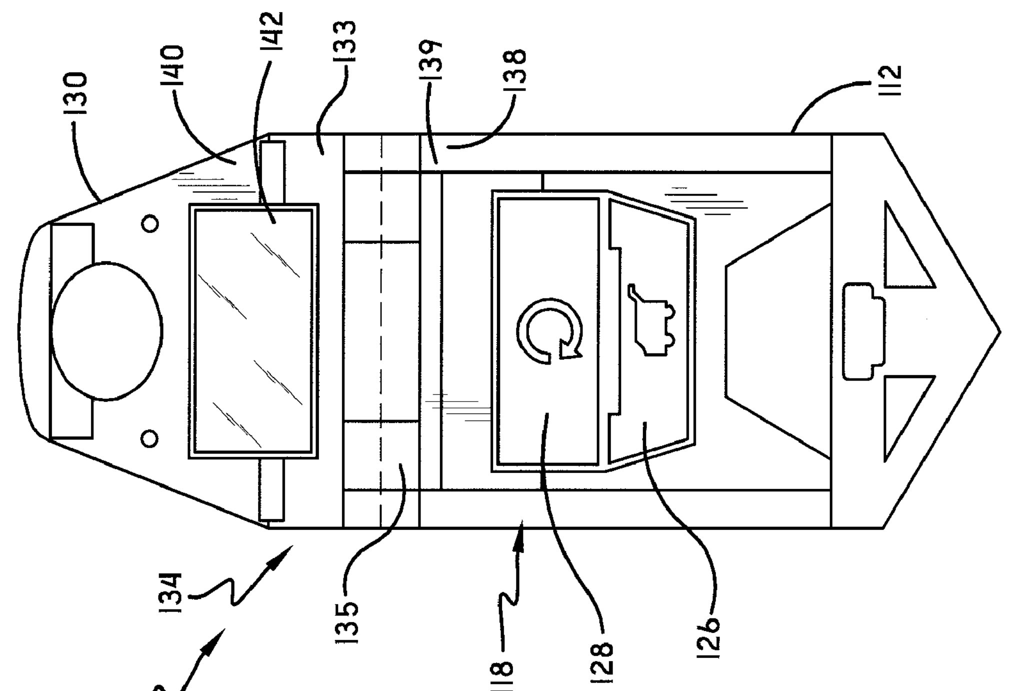
FIG. 2B is a top view of the vehicle activation device of FIG. 2A but showing the cover in a second position.
Figure 2A:
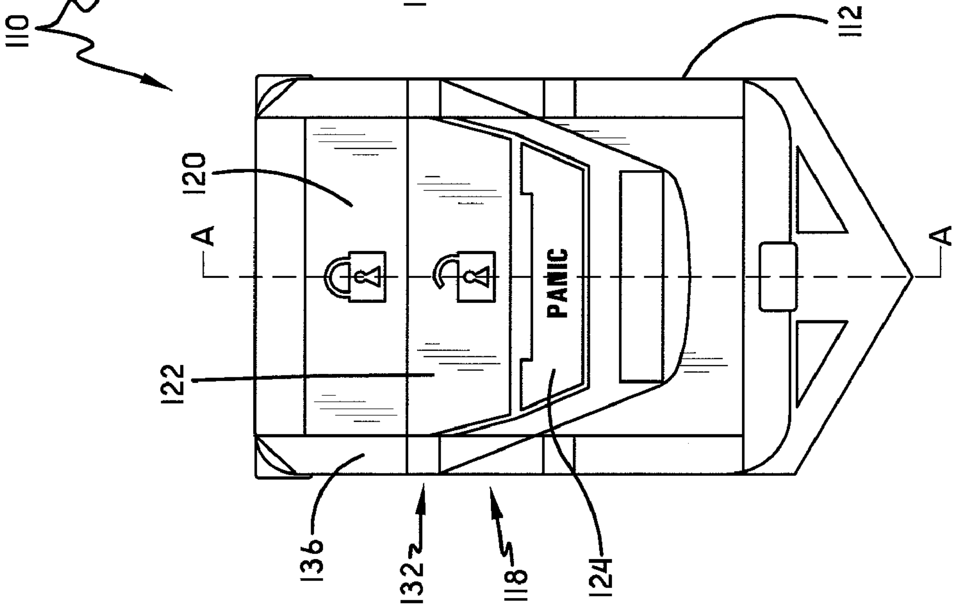
FIG. 2A is a top view of a vehicle activation device according to another embodiment of this invention showing the cover in a first position.

With continuing reference to FIGS. 2A-2C and 3, the specific function buttons 118 that are rendered accessible and inaccessible based on the relative position of the cover 130, can be any chosen with the sound judgment of a person of skill in the art. In FIG. 2A the cover 130 is shown in a first position 132 where function buttons 120, 122 and 124 are accessible (and therefore visible) while function buttons 126, 128 and display 142 are inaccessible (and therefore not visible). In FIG. 2B the cover 130 is shown pivoted (greater than 90 degrees about the pivot axis 131) into a second position 134 where function buttons 128 and 126 as well as display 142 are accessible (and therefore visible). In this case function buttons 120, 122 and 124 are not visible but they may remain, in one embodiment, operational as the operator can still access them. In another embodiment, function buttons 120, 122 and 124 become non-operational when the cover 130 is placed in the second position of FIG. 2B.

With reference now to FIGS. 2A-2C, both the body 112 and cover 130 may have any size and shape chosen with the sound judgment of a person of skill in the art. For the embodiment shown, the body 112 has a thickness that tapers from its second end 14 to its first end 139. The cover 130 shown has a thickness that tapers from its first end 133 to its second end 143. In a more specific embodiment, shown, the degree of tapering of the body 112 and the cover 130 are substantially the same. As a result, the vehicle activation device 110 maintains a substantially similar thickness throughout its length when the cover is in the first position of FIG. 2A. Thus, as shown in FIG. 2C, thicknesses T1, T2 and T3 are substantially equal.

Numerous embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof. For one example, it should be noted that while the cover for each vehicle activation device described above has two primary positions related to the accessibility and inaccessibility of the function buttons, it is contemplated to use three or more primary positions to provide for numerous options regarding function button accessibility.

Having thus described the invention, it is now claimed:

1. A vehicle activation device comprising:
- a body having a first side;
- a cover that is pivotally connected to the body about a pivot axis that is substantially perpendicular and centered equidistant from the edges of the first side of the body;
- a first function button that is accessible from the first side of the body and that remotely activates a first function in the associated vehicle;
- a second function button that is accessible from the first side of the body and that remotely activates a second function in the associated vehicle;
- wherein the cover is pivotal into: (1) a first position where the cover provides access to the first and second function buttons; and, (2) a second position where the cover prevents access to the first function button and provides access to the second function button.

2. The vehicle activation device of claim 1 wherein the vehicle activation device further comprises:
- a third function button that is accessible from the first side of the body and that remotely activates a third function in an associated vehicle.

3. The vehicle activation device of claim 2 wherein:
- when in the first position, the cover prevents access to the third function button; and, when in the second position, the cover provides access to the third function button.

4. The vehicle activation device of claim 1 wherein the first function button that is accessible from the first side of the body unlocks at least one passenger door on the associated vehicle.

5. The vehicle activation device of claim 4 wherein the second function button that is accessible from the first side of the body locks at least one passenger door on the associated vehicle.

6. The vehicle activation device of claim 1 wherein the cover is pivoted about 90 degrees between the first and second positions.

7. The vehicle activation device of claim 1 wherein the cover is substantially H-shaped.

8. The vehicle activation device of claim 1 wherein the first and second function buttons are push buttons.

9. The vehicle activation device of claim 1 wherein the first and second function buttons are touch sensitive buttons.

10. The vehicle activation device of claim 1 further comprising:

a biasing mechanism that biases the cover toward the first position.

11. An activation device comprising:

a body having a first side;

a cover that is pivotally connected to the body about a pivot axis that is substantially perpendicular and centered equidistant from the edges of the first side of the body;

a first function button that is accessible from the first side of the body and that remotely activates a first function;

a second function button that is accessible from the first side of the body and that remotely activates a second function;

wherein the cover is pivotal into: (1) a first position where the cover provides access to the first and second function buttons; and, (2) a second position where the cover prevents access to the first function button and provides access to the second function button.

12. The activation device of claim 11 wherein the cover fully overlaps the body when in one of the first and second positions and projects beyond the body in the other of the first and second positions.

* * * * *